Aug. 5, 1969  L. WINTON  3,459,422
ROUNDABOUT

Filed March 7, 1966  3 Sheets-Sheet 1

INVENTOR.
Lavoy Winton
BY: Newton, Hopkins, Jones & Ormsby
ATTORNEYS

Aug. 5, 1969 — L. WINTON — 3,459,422
ROUNDABOUT

Filed March 7, 1966 — 3 Sheets-Sheet 2

INVENTOR
Lavoy Winton
BY

ATTORNEYS

Aug. 5, 1969    L. WINTON    3,459,422
ROUNDABOUT

Filed March 7, 1966    3 Sheets-Sheet 3

INVENTOR.
Lavoy Winton
BY
ATTORNEYS 3,459,422
ROUNDABOUT
Lavoy Winton, Mount Dora, Fla. 32757
Filed Mar. 7, 1966, Ser. No. 532,242
Int. Cl. A63g 1/00, 1/08
U.S. Cl. 272—51      4 Claims

ABSTRACT OF THE DISCLOSURE

A roundabout amusement ride comprising a supporting chassis, a frame pivotally supported at one of its ends about a horizontally extending axis to the supporting chassis, an hydraulic cylinder-piston assembly operatively connected between the supporting chassis and the frame and operable to pivot the frame from a substantially horizontal attitude toward a vertical attitude. A pump is positioned with its outlet connected to one end of the cylinder and its inlet connected to the other end of and intermediate the ends of the cylinder, whereby continuous operation of the pump displaces the piston in the cylinder to a predetermined position as set by the position of the connection of the pump inlet intermediate the ends of the cylinder. A turntable is connected at its center of rotation to the other end of the frame and rotatable about an axis normal to the frame. A driving wheel energized through a fluid coupling engages the turntable to rotate it about its center of rotation, and a brake mechanism is provided for stopping the driving wheel and turntable during the operation of the fluid coupling.

---

This invention relates to amusement devices and, is more particularly concerned with a roundabout apparatus in which the axis of rotation of the passenger seats may be tilted, preferably in conjunction with a vertical elevation of the axis in order to enhance the pleasure of the occupants as they are carried through a rotary path of travel.

The present invention is also characterized by a trailer type construction whereby the trailer chassis becomes the base supporting structure of the ride, thus constituting a unitized mechanism avoiding the necessity of complete disassembly for transportation and reassembly for use.

The invention further provides a unique drive mechanism for the car or seat supporting turntable by which rotation and control of the turntable may be maintained irrespective of the tilting and elevation of the axis of rotation.

Another feature of the invention is the unique hydraulic tilting and elevating mechanism by which a safety control for the tilting and elevating mechanism is insured and by which an automatic recirculation of the hydraulic fluid is provided for and leakage is prevented.

The structural design, configuration, interrelation and combination of elements whereby assembly and disassembly is facilitated without sacrifice of safety, rigidity, strength and durability is also among the novel features of the mechanism.

Numerous other objects, features and advantages of the present invention will be apparent from a consideration of the following specification taken in conjunction with the accompanying drawings in which.

Figure 4:
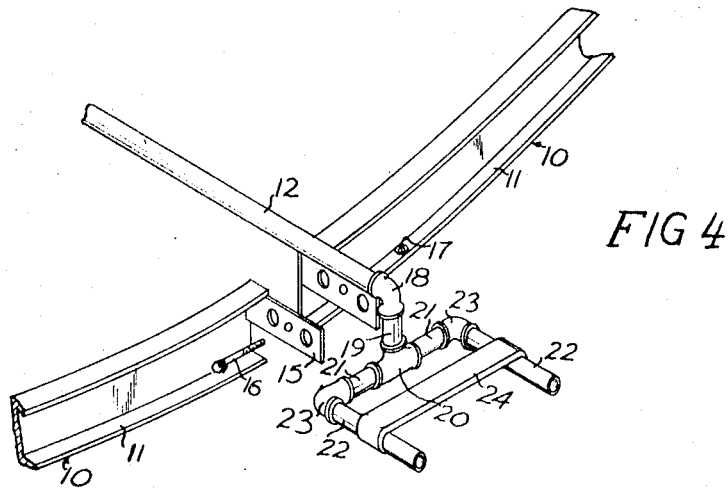
FIG. 4 is a detailed fragmentary and partially exploded view illustrating the ring assembly, arm details and car mounting bracket of the present invention.

In the present form of the invention, the turntable includes a continuous peripheral circular base ring 10 conveniently formed of interconnected channel iron segments 11. The turntable ring 10 is rigidly secured to radiating arms 12 through rigid engagement as by the welding of each individual segment 11 to one of the individual arms 12 as more clearly depicted in FIG. 4. For rigid unitary assembly, each ring segment 11 is provided with an apertured, radially extending bolt plate 15. Bolts 16 and nuts 17 are provided for joining the abutting bolt plates 15 of continuous ring segments. When the device is to be disassembled for transportation, the segments 11 are unbolted and disengaged with one welded arm 12 maintained in rigid relation with each segment 11.

The arms 12 are illustrated as formed of pipes terminating at their outer ends in upper elbows 18 intermediate vertical nipples 19 and lower tees 20. Transverse nipples 21 and outwardly projecting parallel car supports 22 are joined by end elbows 23 with the transverse nipples 21. The individual cars 25 are removably secured upon the parallel pairs of car supports 22 by hooked end car mounting rails 24 in the manner of the mounting of the seats of my prior U.S. Patent No. 3,086,774, issued Apr. 23, 1963.

The passenger cars 25 may, of course, be of various design, construction and configurations, but are here shown as fanciful simulations of jet type airplanes from which the present ride derives its trademark, the "F-80." The cars themselves constitute the subject matter of the design patent application filed on even date herewith.

The arms 12 radiate outwardly from spokes 26 mounted on a central freely rotatable cylindrical hub 28. For ease of assembly and disassembly without sacrifice of rigidity in assembly, the individual tubular arms are telescopically fitted over the spokes 26 of the hub 28. Thus, the arms 12 with their interconnected ring segments 11 will rotate with the corresponding rotation of the hub 28. For storage or transportation, the bolts 16 interconnecting the bolt plates 15 are disengaged and each individual segment 11 is moved radially outward to release it from its telescopic interconnection with its corresponding spoke 26. The arms 12 and attached ring segments 11 may thus be conveniently stored upon a trailer chassis 38, the cars 25 having been removed. From the upper end of the generally cylindrical hub 28, guy rods 30, provided with tensioning turnbuckles 31, extend outwardly to engage the outer end of the arms 12 as at 32 adjacent the ring 10.

Figure 5:
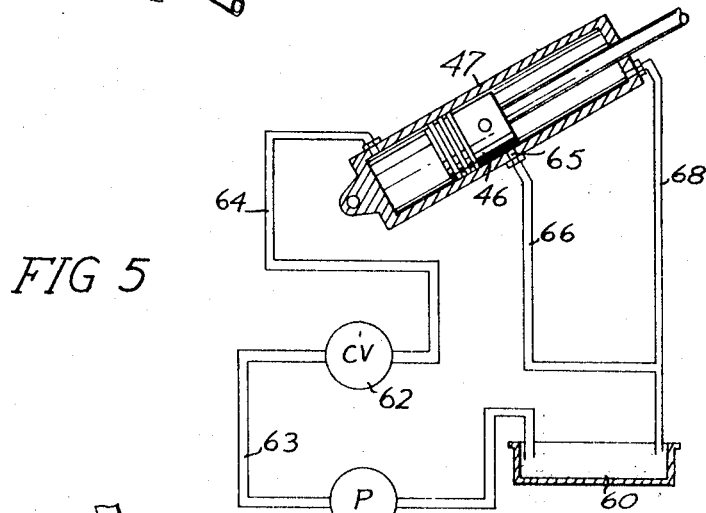
FIG. 5 is a schematic illustration of the hydraulic system for elevating and tilting the turntable axis.

The hub 28 is perpendicularly supported for free rotation on a perpendicular fixed axle 27 at the outer free end of a pivoted frame 35, pivoted as at 36, adjacent the end of the trailer chassis 38. For tilting the frame 35 a tilt arm 40 is provided, the outer free end 41 of which is provided with an engaging pin 42 within a slot 44 of the frame 35. For pivoting the tilt arm 40 a hydraulic piston 46 and cylinder 47 are provided as illustrated in detail in FIG. 5. The piston rod 48 of the piston 46 is connected at its outer end with a thrust pin 49 pivotally engaging the tilt arm 40. The inner end of the cylinder 47 is also pivoted as at 43 to the chassis 38 to accommodate tilting motion of the tilt arm 40 as it is rocked, in clockwise position, as seen in FIG. 3, to elevate the hub 28 or in opposite direction as the frame 35 is lowered.

Figure 1:
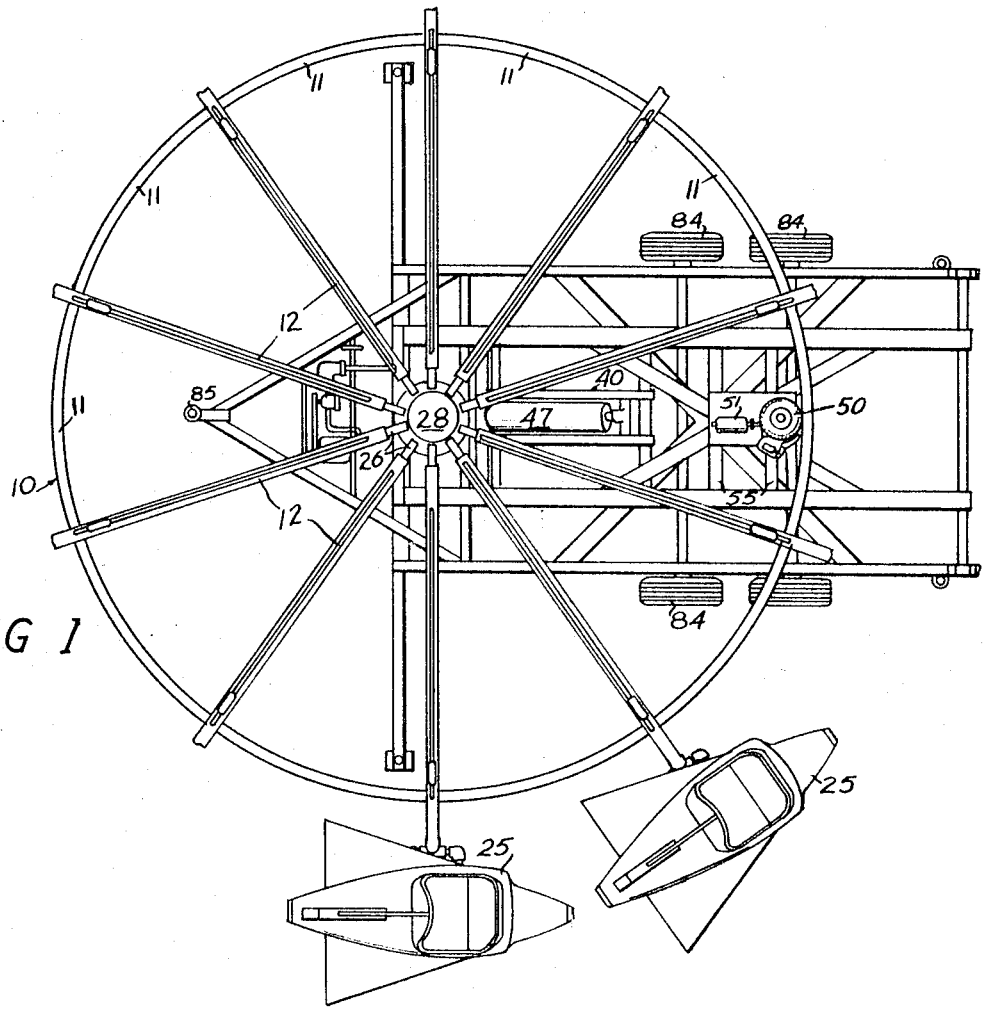
FIG. 1 is a top plan view of one embodiment of the present invention showing the turntable in horizontal position with the axis of rotation vertical.
Figure 2:
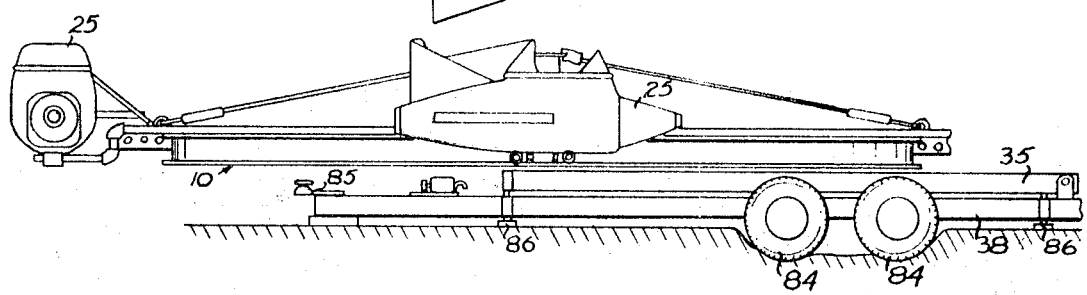
FIG. 2 is a side elevation of the apparatus in the position illustrated in FIG. 1.
Figure 3:
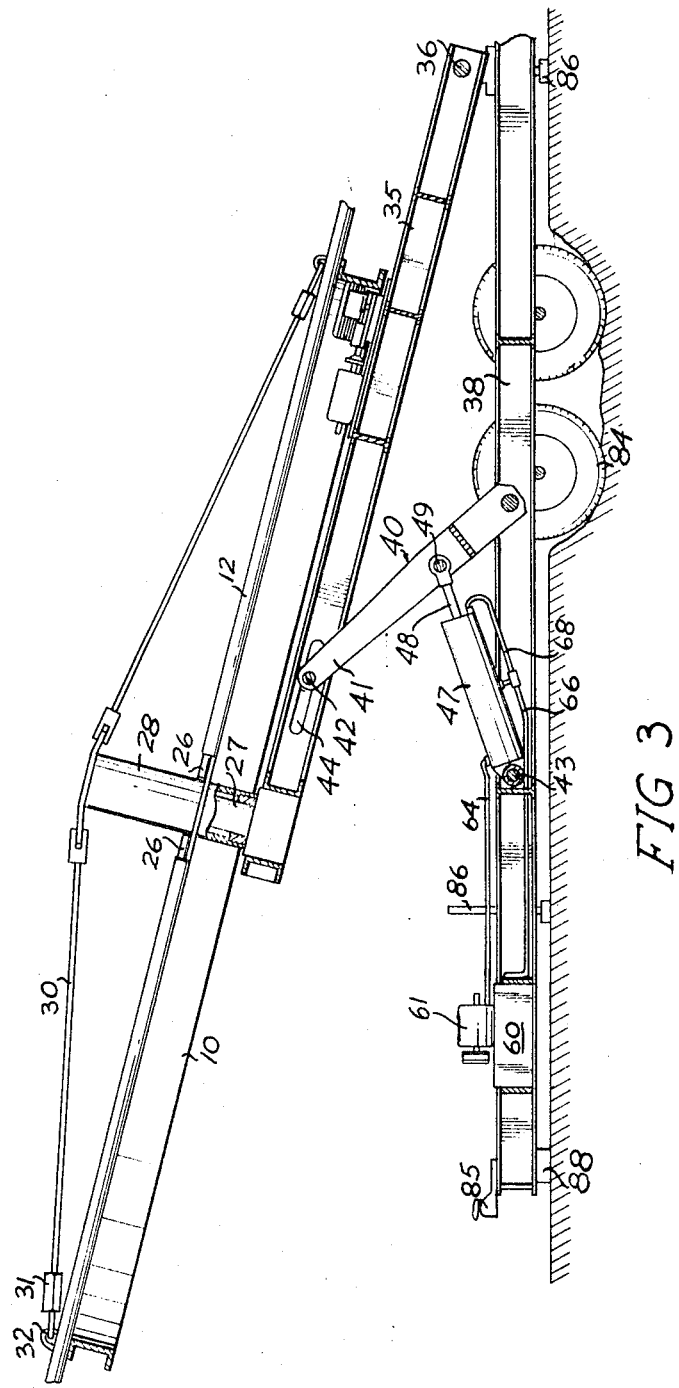
FIG. 3 is a side elevation similar to FIG. 2 showing the turntable axis in its tilted and elevated position.

The hydraulic system for the piston and cylinder combination includes a hydraulic fluid tank or sump 60 from which a pump 61, when in operation, delivers fluid under pressure to the manually operable check valve 62 through the pressure line 63 thence by line 64 to the cylinder 47, thus forcing the piston 46 outwardly in the cylinder 47 to elevate the pivot frame 35 by clockwise pivotal movement as shown in FIG. 3. The outward thrust of the piston 46 is limited by the location of the open end 65 of a return flow pipe 66 leading from a mid position of the cylinder 47 to the sump 60. As the piston 46 travels outwardly in the cylinder 47, it passes the open end 65 of the pipe 66, thus permitting free flow of the pressure fluid back to the sump 60. During operation of the pump 61, retrograde inward motion of the piston 46 will be precluded by the continuation of the fluid pressure from the pump 61.

The pipe 66 is of sufficient diameter to serve to stop the outward movement of the piston 46, also. Further, after lifting of the pivot frame 35 by outward motion of the piston 46, return movement after termination of the pump operation is precluded by the check valve 62 which is manually movably set during the lifting operation to prevent fluid return from the cylinder 47 through pipe 64 and line 63. However, when the pivot frame 35 is to be lowered after termination of pump operation, the manual check valve 62 is operated manually to permit fluid to bypass the check valve 62 and return through the nonoperating pump 61 to the sump 60. The construction and operation of such manually controlled check valve is well understood in the art. A second return flow pipe 68 is provided between cylinder 47 and sump 60 beyond the piston 46 whereby fluid leaking past the piston may be returned to the sump 60.

Rotation is imparted to the turntable through the ring 10 by the provision of a friction driving tire 50 mounted with its driving motor 51, fluid coupling 52, and gear box 53 on a platform 54 supported by cross rails 55 of the tilt frame 35. The mounting of the tire 50 is such that it will continuously bear against the inner face of the ring 10. Since the mounting of tire 50 and its drive mechanism moves with the tilt frame 35, the contact of tire 50 with the ring 10 is continuously uniform so as to provide for rotation of the ring 10 regardless of the tilted position of the tilt frame 35.

Figure 6:
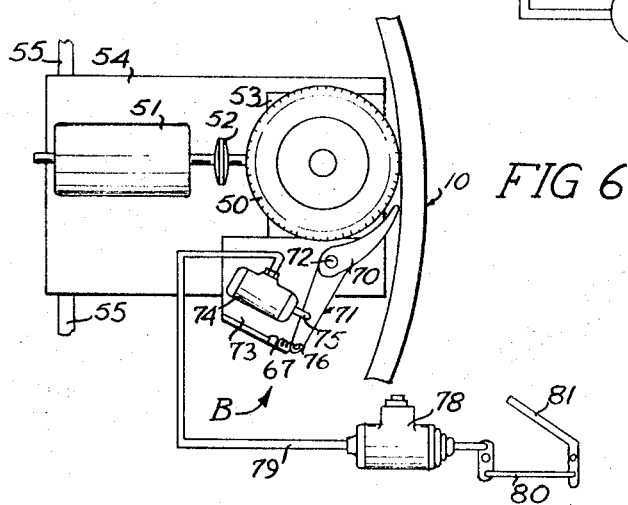
FIG. 6 is a detailed illustration of the turntable ring, drive wheel and braking mechanism.

As further to be noted from a consideration of FIG. 6, the platform 54 supports a brake mechanism B for stopping rotation of the tire 50. Since the ring 10 drivingly contacts the tire 50 at all times, the brake mechanism also serves to stop rotation of the ring 10. The brake mechanism B includes a brake shoe 70 formed on the outer end of a brake beam 71 pivotally mounted as at 72 on a brake support plate 73 secured to the upper face of the platform 54. The plate 73 also supports a brake cylinder 74 of conventional form with a piston connected by a brake rod 75 to the extended operating projection 76 of the brake beam 71. A spring 67 between plate 73 and beam 71 normally maintains the shoe 70 spaced from the periphery of the tire 50. However, when fluid pressure, as from a master cylinder 78 through line 79 is applied to the brake cylinder 74, the shoe 70 will engage the tire 50 to terminate its rotation and hence the rotation of the ring 10. Control of the master cylinder 78 may be through any manual means such as the pivotal linkage 80 and manual handle 81 indicated in FIG. 6. With respect to the fluid operative friction brake mechanism B in combination with the fluid coupling 52 it is to be noted that in emergency, the brake may supercede the drive to instantly stop the ring 10 despite a possible lag in the termination of drive by motor 51.

The chassis 38 is provided with the conventional wheels 84 and the usual trailer hitch 85 by which the trailer may be attached and disattached for transportation of the chassis 38 and the ride mounted thereon. When in use, it will be noted that the wheels 84 may be received in holes formed at the desired location, hence permitting the chassis 38 to stand horizontally, jacks 86 are preferably provided to establish the desired level for the chassis and a support 88 may be inserted at the front end of the chassis to maintain a horizontal equilibrium thereof despite the tilting and rotation of the ring 10.

It will be obvious to those skilled in the art that many variations may be made in the embodiments chosen for the purpose of illustrating the present invention without departing from the scope thereof as defined by the appended claims.

What is claimed as invention is:

1. A roundabout amusement ride comprising a supporting chassis, a frame pivotally supported at one of its ends about a horizontally extending axis to said supporting chassis, an hydraulic cylinder-piston assembly comprising a piston reciprocally received in a cylinder, said hydraulic cylinder-piston assembly being operatively connected to said supporting chassis and to said frame at a position displaced from said axis and operable to pivot said frame from a substantially horizontal attitude toward a vertical attitude, a pump having its outlet connected to one end of said cylinder and its inlet connected to the other end of and intermediate the ends of said cylinder, a check valve positioned between said pump outlet and said one end of said cylinder for permitting fluid flow from said pump toward said cylinder and normally prohibiting fluid flow from said cylinder back toward said pump, means for opening said check valve to permit fluid flow from said cylinder back toward said pump, whereby continuous operation of said pump displaces said piston in said cylinder to a predetremined position as determined by the position of the connection of the pump inlet intermediate the ends of said cylinder, a turntable connected at its center of rotation to the other end of said frame and rotatable about an axis normal to said frame, passenger compartments spaced at intervals about said turntable, a driving wheel engaging said turntable to rotate said turntable about its center of rotation, fluid driving means for driving said driving wheel, and brake means engageable with said driving wheel and operable to stop said driving wheel during the operation of said fluid driving means.

2. The invention of claim 1 wherein said fluid driving means comprises a motor and a fluid coupling between said motor and said driving wheel.

3. The invention of claim 1 wherein said turntable defines an annular track and said driving wheel engages the inner surface of said annular track.

4. The invention of claim 3 wherein said annular track is connected to a central hub by a plurality of circumferentially spaced radiating spokes each telescopically received in a tubular arm.

References Cited

UNITED STATES PATENTS

| 1,263,370 | 4/1918 | Brundage et al. | 272—33 |
| 2,631,266 | 3/1953 | Britt | 272—36 |
| 3,101,943 | 8/1963 | Bartlett | 273—36 |
| 3,112,927 | 12/1963 | Eyerly et al. | 272—36 |
| 3,140,092 | 7/1964 | Hrubetz | 272—36 |

FOREIGN PATENTS 838,961   6/1960   Great Britain.

ANTON O. OECHSLE, Primary Examiner

ARNOLD W. KRAMER, Assistant Examiner

U.S. Cl. X.R.

272—29, 48